United States Patent [19]

Ely

[11] Patent Number: 4,636,260
[45] Date of Patent: Jan. 13, 1987

[54] METHOD OF MAKING A SEALING GLASS SUSPENSION

[75] Inventor: William F. Ely, Painted Post, N.Y.

[73] Assignee: Corning Glass Works, Corning, N.Y.

[21] Appl. No.: 759,352

[22] Filed: Jul. 26, 1985

[51] Int. Cl.$^4$ ............................ C08L 1/18; C08L 1/08
[52] U.S. Cl. ................................ 106/198; 106/193 R; 106/195
[58] Field of Search ........................ 106/193, 198, 195

[56] References Cited

U.S. PATENT DOCUMENTS

| | | | |
|---|---|---|---|
| 3,967,973 | 7/1976 | Francel et al. | 106/193 J |
| 4,260,406 | 4/1981 | Corbett et al. | 106/195 |
| 4,293,439 | 10/1981 | Corbett et al. | 106/195 |
| 4,444,813 | 10/1984 | Pirooz | 106/195 |
| 4,521,251 | 6/1985 | Otake et al. | 106/195 |

*Primary Examiner*—Theodore Morris
*Attorney, Agent, or Firm*—C. S. Janes, Jr.

[57] ABSTRACT

A method of making a sealing glass suspension composed of a sealing glass, a gelling agent and a vehicle is disclosed. The glass and gelling agent are combined and stored prior to exposure to the vehicle.

9 Claims, No Drawings

METHOD OF MAKING A SEALING GLASS SUSPENSION

BACKGROUND OF THE INVENTION

This invention relates to a method of preparing a sealing glass suspension, also referred to as a paste, for use in a thermal sealing operation wherein a ribbon of suspended sealing glass is applied between parts to be joined, and the glass in the ribbon is thermally softened. It is particularly concerned with a novel method which provides flexibility in storage and transportation practices while maintaining material stability.

Sealing glass suspensions have been used in the fabrication of many different kinds of assemblies comprising ceramic parts, including, for example, glass envelopes for electrical devices, glass-ceramic components for telescope mirror blanks, and ceramic substrates for electrical circuits. Such suspensions are typically provided in paste form, comprising a major proportion of fritted sealing glass and a minor proportion of a pyrolyzable organic vehicle which burns away during the process of firing to effect sealing between the sealing glass and the ceramic parts to be sealed.

One of the most demanding applications for sealing glass suspensions is in the manufacture of cathode ray tube envelopes for television picture tubes and the like. Such envelopes are fabricated by sealing together a glass funnel member and a glass face plate or panel member.

The sealing glass suspension may be applied from a reservoir through an orifice. It is applied as a continuous ribbon or bead to at least one of the mating surfaces provided on the panel and funnel. These parts are then joined and fired to provide an integral assembly wherein the fused sealing glass provides a mechanically strong, high dielectric strength, hermetically sealed joint.

For this and similar applications, the pyrolyzable organic vehicle for the solder glass suspension typically comprises a cellulose binder and an organic solvent for the binder, e.g., a nitrocellulose binder with an amyl acetate solvent. Fritted solder glass additions of about 10-15 parts by weight of fritted glass for each part of organic vehicle are typically used to provide a suspension having the consistency of a paste, suitable for controlled application to a substrate to be sealed.

Sealing glass suspensions have found wide commercial application, and have been the subject of much technical study. However, a problem of shelf life stability has continued to plague the industry.

It is well-known that consistent viscosity is a critical factor in glass suspension application to a sealing surface. It is also well-known the viscosity of a paste may change markedly if the paste is not used promptly after mixing. This tendency becomes serious when long intervals occur between preparation of a suspension and its use. Delays can occur due to interruptions in the sealing process; if an inventory or suspension is desired; or in case of overseas shipments where lengthy transportation and storage times are inevitable.

PURPOSES OF THE INVENTION

A basic purpose is to provide an improved method of preparing a sealing glass suspension.

Another purpose is to provide a method whereby the problems caused by fluctuating viscosities are essentially avoided.

A further purpose is to provide a method of preparing a sealing glass mixture that has a stable shelf life over lengthy periods of time.

A particular purpose is to provide a method of preparing a sealing glass suspension that permits lengthy storage and/or transportation times before use.

PRIOR LITERATURE

U.S. Pat. No. 4,260,406 (Corbett-Guile) discloses a method of preparing a solder glass suspension characterized by adding a gelling agent to the suspension to impart a gelled structure. Among the agents disclosed are colloidal silica, certain clays, methanol, acetic acid and fluorocarbon surfactants, but the preferred agents are the titanate coupling agents.

U.S. Pat. No. 4,444,813 (Pirooz) discloses a method of making a sealing glass suspension in which a particulate sealing glass is placed in a mixing container in measured amount, a gel producing vehicle is added, and the mixture agitated to produce the suspension. Powdered silica and titanate coupling agents are disclosed as gelling agents added to the vehicle.

SUMMARY OF THE INVENTION

The present inventive method is primarily embodied in the initial step of a two step process for preparation and application of a sealing glass suspension. Frequently, there is a lengthy delay between the two steps, the second step normally occurring just prior to applying the suspension for sealing purposes.

The initial step, as contemplated by the present invention, involves bringing together in pedetermined proportions, and intimately mixing, all of the dry solid materials in the ultimate sealing glass suspension. These include the sealing glass and gelling agent in finely divided form, as well as agents for crystal nucleation in the glass. In one embodiment, the dry solids are mixed in a conventional commercial mixer or blender, and then packaged for storage or transport in a container sealed against the environment.

In another embodiment, the dry solids are introduced into a container in predetermined proportions and intimately mixed in the container. The total amount added to the container is limited to permit subsequent addition of vehicle and mixing. The gelling agent is added in an amount determined to provide a desired viscosity in the ultimate suspension.

The container, partially filled with dry solids, is sealed against the atmosphere until time to use the suspension. Then the container is opened and a predetermined amount of vehicle is injected into the opening to mix with the dry solids. The container is resealed and subjected to agitation to mix the ingredients into a sealing glass suspension. The intimately mixed suspension may then be applied through an orifice to a sealing surface in conventional manner.

Alternatively, in either embodiment, the dry solids may be removed from the container and combined with the vehicle in conventional manner, e.g. in a commercial blender.

GENERAL DESCRIPTION OF THE INVENTION

It has been customary to prepare sealing glass suspensions in containers that are inert to the suspension components. In particular, the vehicle tends to react with metals. Hence, past practice has been to use an inert plastic container or a metal container with its interior coated with an inert material commonly referred to as "vitreous epoxy".

The use of gelling agents in forming sealing glass suspensions, and the agents used, particularly the titanate coupling agents, are described in detail in the Corbett-Guile and Pirooz patents noted earlier. The patent teachings are incorporated herein by reference, and the practice of using gelling agents is continued.

The critical difference is that the gelling agent is added to the sealing glass in the present instance. In contrast, the practice heretofore was to incorporate the gelling agent in the vehicle before adding to the powdered glass frit.

The present invention is grounded in my discovery that the desired properties of long-term shelf life and stability can be achieved if the solid components of the suspension are combined and maintained separately from the vehicle until just prior to use when the vehicle may be added.

The solid components of the suspension are the sealing glass and the gelling agent. These are combined in finely divided form in predetermined proportions and intimately mixed. This may occur in the container, or may occur before the mix is added to the container.

The amount of gelling agent will depend on the agent used. Thus, when a titanate coupling agent is used a few hundredths of a percent will normally suffice. In contrast, on the order of a half, up to one, percent of a silica or clay may be used.

The sealing glass may be any of the soft sealing glasses known as "solder sealing glasses" and used in sealing operations. U.S. Pat. No. 2,889,952 (Claypoole) discloses a family of lead-zinc borosilicates for the purpose.

A wide range of gelling agents, as well as their function, are disclosed in the patents mentioned earlier. However, I have found the titanate coupling agents particularly effective for my purpose. These are commercially available in adsorbed form on silica or silicate substrates. It is my belief that the coupling agents act as molecular bridges at the interface between the sealing glass and the nitrocellulose vehicle.

There is a readily apparent difference between a suspension prepared by the present procedure, and one prepared by mixing the gelling agent with the vehicle and then subsequently adding glass. A suspension prepared by the present procedure takes on a highly viscous, thixotropic character almost immediately upon the vehicle being added and mixed with the premixed solids. In contrast, a suspension, prepared by mixing the gelling agent with the vehicle and then combining that mixture with glass, does not take on a viscous, thixotropic character until 2-4 hours after forming the suspension.

It is my belief that, when the gelling agent is premixed with vehicle, an attraction of some nature occurs between the gelling agent and the nitrocellulose vehicle. As a consequence, no immediate bonding occurs between frit particles and titanate bonding sites. Hence, the viscosity of the suspension, initially, is like that of a suspension made with no gelling agent. The bonding of frit particles and nitrocellulose occurs only after the titanate is released from the nitrocellulose.

In the present method, where nitrocellulose vehicle is added to a combination or mixture of glass and titanate coupling agent, there is the potential for competition between the frit particles and the nitrocellulose for the titanate bonding sites. I believe the titanate preferentially bonds to the frit, whereby the frit particle surface can be immediately altered by the titanate molecules. This causes increased attraction to the cellulose chains, thus causing the viscosity to immediately increase.

In carrying out one embodiment, the mixture of sealing glass and gelling agent is packed in inert containers. The container is only partially filled, sufficient room being left for subsequent introduction of vehicle and mixing. The container is sealed to maintain the dry mix isolated from the atmosphere until it is time to add vehicle to form a sealing suspension.

Meanwhile, the container may be in storage or in transit for extended periods. When it is opened and vehicle added, reasonably predictable viscosity characteristics are observed, thus providing improved shelf life and product stability.

The amount of vehicle added to a container to form a suspension will depend on the manner of application of the suspension to the sealing surface and the particular characteristics required. This is in accordance with standard sealing practice. The standard vehicle employed in the industry is nitrocellulose dissolved in amyl acetate. Typically, one to two parts nitrocellulose are dissolved in 99 to 98 parts amyl acetate. The vehicle is customarily added in an amount of one part by weight to 10–15 parts by weight of the solids mixture.

In preparing to start sealing operations, a container of the dry mix is opened and a suitable amount of vehicle added. The suspension ingredients are intimately mixed by agitation, for example by holding a few minutes in a vibrating paint mixer. The suspension or paste thus produced is applied to a sealing surface in conventional manner, for example through an orifice.

While one mode of operation has been described, it will be appreciated that standard conventional mixing practice may be used in preparing the final suspension. Thus, the premixed solids may be removed from the container and combined in predetermined proportions with the vehicle in commercial mixing equipment, such as the well-known Hobart mixer.

DETAILED DESCRIPTION

The invention is further described with reference to specific studies made in the course of developing the inventive method.

The sealing glass employed in these studies was a commercially used, devitrifiable, lead-zinc borosilicate. The approximate glass composition in parts by weight, as calculated from the batch on an oxide basis, follows:

| | |
|---|---|
| PbO | 75 |
| ZnO | 12 |
| $B_2O_3$ | 9 |
| $SiO_2$ | 2 |
| BaO | 2 |

The glass was melted and drawn as thin ribbon in the range of 10–50 mils. This was ball milled to pass a 100 mesh screen.

The titanate coupling agent employed was obtained from Kenrich Petrochemicals, Inc., Bayonne, N.J. under designation KR 138 S/M. In this material, the titanate coupling agent was adsorbed by a porous carrier, calcium silicate.

Silica powder, in total amount up to 0.1%, is required for controlled devitrification. Zircon was also employed to control devitrification. Both the silica and zircon were passed through a 100 mesh screen. The coupling agent was passed through a 50 mesh screen.

The various dry materials noted above were combined in predetermined proportions with the sealing glass. This mixture was blended for 15 minutes in a commercial blender. The mix was then removed for packaging and storage in containers having an inert, vitreous epoxy lining. Five (5) pounds of mix were introduced into each container.

In one set of experiments, a mixture was produced by adding 0.01% titanate, coupling agent, 0.8% zircon and 0.04% silica to 100 parts sealing glass.

One group of samples was prepared with one batch of the titanate coupling agent, while a separate batch, obtained at a different time, was used for a second group. One group was packed in small containers; another in larger containers. Also different combinations of shaking and rolling steps were employed for mixing. The purpose was to determine the effect of these independent variables on mix performance.

Each container was carefully opened by removing a plug type closure and a nitrocellulose-amylacetate vehicle was added in controlled amount of about 11½ parts by weight dry mix to one part vehicle. This vehicle contained 1.2% nitrocellulose. The container was closed, subjected to a fixed mixing schedule, removed, and viscosity determined in a Brookfield, spindle-type viscometer.

The several viscosities varied, with one marginal exception, from 592 to 685 poises, the values being within a range of 570-690 poises established as providing desirable bead characteristics under the conditions of the experiment.

This study indicated that these independent variables had relatively minor effects which could be compensated if necessary.

Another study was made to determine the effect of (1) varying the amount of coupling agent and (2) varying the frit to vehicle ratio. Since the coupling agent introduced silica, the silica level was adjusted to provide a constant level of about 0.05%. Zircon was maintained constant at 0.8%. The coupling agent, KR 138 S/M, was added to 100 parts of glass in amounts of 0.01%, 0.03% and 0.055% by weight.

These samples were milled, mixed and packed as described above. When they were opened for vehicle addition, the samples were divided into two groups so that vehicle was added as 216 grams per 5 lb. of solids and 181 grams per 5 lb. of solids. This provided a weight ratio (WR) of 10.5:1 in the first case and 12.5:1 in the second case.

Viscosities measured after mixing are shown below:

| Coupling Agent (%) | WR | Viscosity (poises) |
| --- | --- | --- |
| 0.01 | 10.5 | 217 |
| 0.03 | 10.5 | 387 |
| 0.055 | 10.5 | 433 |
| 0.01 | 12.5 | 232 |
| 0.03 | 12.5 | 404 |
| 0.055 | 12.5 | 458 |

These viscosity values are consistently lower than those in the earlier experiment because a different source of vehicle containing 1.08 nitrocellulose, was employed. Viscosity values of 450-475 poises were found to provide proper sealing bead characteristics for cathode ray tube sealing. The lower values could be increased into the desired range. However, they illustrate that the viscosity of a sealing suspension increases as either the weight ratio of solids to vehicle increases or the amount of coupling agent present increases.

I claim:

1. In a method of preparing a sealing glass suspension including a finely divided sealing glass, a gelling agent including a titanate coupling agent, and a vehicle, the improvement whereby all of the solid ingredients of the suspension are brought together in predetermined proportions and intimately mixed together prior to being exposed to the vehicle.

2. A method in accordance with claim 1 wherein the intimately mixed solids are stored in a container prior to mixing with vehicle.

3. A method in accordance with claim 2 wherein the container interior is inert to suspension ingredients.

4. A method in accordance with claim 2 wherein the intimate mixture of dry solids is removed from the container and mixed with a predetermined amount of vehicle to form a sealing glass suspension.

5. A method in accordance with claim 2 wherein the container is only partially filled with solids, is sealed and subsequently opened to introduce a predetermined amount of vehicle which is intimately mixed with the solids to form a sealing glass suspension in the container.

6. A method in accordance with claim 5 wherein the volume of the container minus the volume of the solids introduced is greater than the volume of vehicle to be introduced.

7. A method in accordance with claim 5 wherein the ratio of the amount of vehicle injected to the amount of solids in the container, by weight, is in the range of 1:10 to 1:15.

8. A method in accordance with claim 1 wherein the amount of gelling agent is less than about one percent of the glass-gelling agent mixture.

9. A method of preparing a sealing glass suspensing including the steps of,
 (a) mixing weighed amounts of a finely divided sealing glass and a gelling agent,
 (b) introducing an amount of the glass-gelling agent mixture into a container, the amount introduced only partially filling the container,
 (c) sealing the container against the atmosphere,
 (d) subsequently opening the container to inject a predetermined amount of vehicle into the container, and
 (e) intimately mixing the vehicle and solids to form a stable sealing glass suspension.

* * * * *